(12) United States Patent
Yang

(10) Patent No.: US 9,369,747 B2
(45) Date of Patent: Jun. 14, 2016

(54) SYSTEM AND METHOD OF GROUPING BROADCASTING SIGNALS BASED ON MULTIMEDIA DNA INFORMATION

(71) Applicant: Naver Corporation, Seongnam-si, Gyeonggi-do (KR)

(72) Inventor: Byoung Seok Yang, Seongnam-si (KR)

(73) Assignee: NAVER Corporation, Seongnam-si (KR)

(*) Notice: Subject to any disclaimer, the term of this patent is extended or adjusted under 35 U.S.C. 154(b) by 270 days.

(21) Appl. No.: 14/157,064

(22) Filed: Jan. 16, 2014

(65) Prior Publication Data

US 2014/0201771 A1    Jul. 17, 2014

(30) Foreign Application Priority Data

Jan. 16, 2013  (KR) .................. 10-2013-0004672

(51) Int. Cl.
| H04N 7/16 | (2011.01) |
| H04N 21/25 | (2011.01) |
| H04N 21/4788 | (2011.01) |
| H04N 21/84 | (2011.01) |

(52) U.S. Cl.
CPC ......... H04N 21/252 (2013.01); H04N 21/4788 (2013.01); H04N 21/84 (2013.01)

(58) Field of Classification Search
CPC combination set(s) only.
See application file for complete search history.

(56) References Cited

U.S. PATENT DOCUMENTS

| 2005/0262542 | A1* | 11/2005 | DeWeese | H04L 12/1818 725/106 |
| 2006/0106867 | A1* | 5/2006 | Burges | G06F 17/30026 |
| 2007/0041667 | A1* | 2/2007 | Cox | G06F 17/30017 382/305 |
| 2009/0193124 | A1* | 7/2009 | Larsson | G06Q 10/10 709/227 |
| 2011/0247044 | A1* | 10/2011 | Jacoby | H04N 21/4351 725/115 |

FOREIGN PATENT DOCUMENTS

| JP | 2003-345729 | 12/2003 |
| JP | 2004-235694 | 8/2004 |
| JP | 2012-528378 | 11/2012 |
| JP | 2012-244340 | 12/2012 |

(Continued)

OTHER PUBLICATIONS

Korean Office action issued in corresponding Korean Patent App. No. 10-2013-0004672, dated May 23, 2014.

(Continued)

*Primary Examiner* — Chenea Smith
(74) *Attorney, Agent, or Firm* — Greer Burns & Crain Ltd.

(57) ABSTRACT

A system of grouping broadcasting signals based on a multimedia DNA of corresponding broadcast, which groups users viewing the same broadcast through the multimedia DNA of each broadcasting signal output from a TV in real time. A DNA information receiver receives DNA information on broadcasting signals, which are broadcasted through each TV. A DNA information grouping unit calculates similarity of the DNA information received through the DNA information receiver, and when the calculated similarity satisfies a predetermined similar condition, determines the similar DNA information as the DNA information of the same broadcasting signal to group the DNA information into the same group. A group information transmitter transmits group related information of each group grouped by the DNA information grouping unit to each TV.

17 Claims, 8 Drawing Sheets

(56) References Cited

FOREIGN PATENT DOCUMENTS

| | | | |
|---|---|---|---|
| WO | WO 2010/137905 | A2 | 12/2010 |
| WO | WO 2010/137905 | A3 | 12/2010 |

OTHER PUBLICATIONS

Japanese Office action issued in corresponding Japanese Patent App. No. 2014-005939, dated Nov. 4, 2014.

* cited by examiner

SYSTEM AND METHOD OF GROUPING BROADCASTING SIGNALS BASED ON MULTIMEDIA DNA INFORMATION

CROSS-REFERENCE TO RELATED APPLICATIONS

This application claims priority from and the benefit of Korean Patent Application No. 10-2013-0004672, filed on Jan. 16, 2013, which is hereby incorporated by reference for all purposes as if fully set forth herein.

BACKGROUND OF THE INVENTION

1. Field of the Invention

The present invention relates to an apparatus for grouping users viewing television (TV) broadcasts, and more particularly, to an apparatus, a method, and a computer readable recording medium of grouping users viewing the same broadcast using a multimedia DNA of a broadcasting signal output from a TV in real time.

2. Discussion of the Background

With the recent development of technology, the TV provides an interactive function with a user and various additional services using the Internet in addition to a function of displaying audio-coded images received via radio wave or cable broadcasting signals from a broadcasting station.

Typically, in order to receive digital broadcasts, an apparatus such as a set top box (STX) as well as a TV is additionally required. The set top box refers to an apparatus which is connected to the TV to receive a signal input from the outside, appropriately converts the received signal, and displays the contents of the converted signal on the TV. The set top box, meaning a box lying on a TV set, is a household communication terminal required to use a next-generation interactive multimedia communication service (so called an interactive TV), such as video on demand (VOD), home shopping, network games, and the like, and also is called a 'subscriber signal conversion apparatus.' The set top box is connected to the interactive TV or phone, a network for a video transmission service of a company, the TV, and the like, at home.

The set top box includes a function of receiving and converting a video signal as a basic function in addition to a function of communicating with a video server, and the like, which is installed in a phone company or a cable television system (CATV) station. Further, in order to simultaneously use data communication services, such as phone communications, PC communications, and the like, the set top box of various standards having a phone interface, an access interface with a personal computer (PC), and the like, has been reviewed. Therefore, in order to dominate an interactive TV market, manufacturers of communication devices, computers, and home appliances are competing to commercialize and sell the set top box with multiple functionalities.

Meanwhile, the set top box does not necessarily include a tuner and an external signal is transmitted to the set top box, using an Ethernet cable, a satellite receiving or terrestrial receiving antenna, a coaxial cable, a telephone line, an analog very high frequency (VHF) or an ultra high frequency antenna, and the like. An example of contents which are able to be received through the set top box may include video, audio, internet web pages, games, and the like.

As such, the TV may receive various information services as well as broadcasting information through the set top box, interworking with the Internet, and may select and control services through the interactive communication with a user. In order for a user to easily input a selected signal, a function of a remote controller needs to be variously expanded, and the remote controller needs to have a convenient interface.

Further, the TV having the function of the set top box embedded therein may view the terrestrial broadcast, and may be connected to the Internet to perform various computer functions, such as video-on-demand (VOD), games, video communication, application utilization, and the like. A conventional TV may also be connected to the set top box as described above to use the above-described functions, and since the TV replacement period is long, the TV and the set top box markets have been developed simultaneously.

As various additive services through the TV or the set top box increase, and various demands increase, viewers viewing the TV broadcasts want to share opinions on the broadcasts with other viewers who view the same broadcasts. However, due to various communication devices provided through the applications installed on the TV, it is not easy to confirm which channels are viewed by which individuals without a server providing a separate information collection apparatus and a method of grouping users viewing the same channel.

An exemplary method of analyzing broadcast-related contents, such as a method of analyzing music, or advertising contents by a generation of an audio DNA and calculating a frequency of broadcasting or a frequency of exposure to collect statistics thereof, is disclosed in Korean Patent Laid-Open Publication No. 2006-0038669 entitled "Broadcasting Contents Analysis System And Method Through The Generation Of Audio DNA, (Mureka, Inc.)."

However, the method may analyze only the broadcasted contents and does not provide a device of grouping users who view the same broadcast and a communication device within a group. Further, since the server needs to analyze and process all types of the broadcasting information collected from each user, the burden of the server may be increased.

As for the Internet, when a user logs onto the computer to enter each broadcasting channel, since a chatting device which may provide communication between the users entering the corresponding broadcasting channel is provided by interworking with the broadcasting image, the users communicate with each other while viewing the broadcast. However, for the TV, it is impossible to add a communication device in the predetermined broadcasting channel because the information of the users viewing the same channel may not be collected. As a result, the device that communicates between the users viewing the same channel does not provide information on which channels are viewed by which users.

Therefore, there is a need for grouping the users viewing the same broadcast by analyzing the broadcasting output through the TV and providing various additive services to the grouped users.

SUMMARY OF THE INVENTION

An object of the present invention is to provide an apparatus, a method, and a computer readable recording medium of grouping users, using a multimedia DNA of broadcast, which group similar multimedia DNAs into the same group by comparing multimedia DNAs of broadcasting signals output from TVs in real time. The multimedia DNA refers to audio or video media information uniquely characterizing an associated broadcasting signal having a distinctive format.

Another object of the present invention is to provide an apparatus, a method, and a computer readable recording medium of grouping users, using a multimedia DNA of broadcast, which group similar multimedia DNAs into the same group by comparing multimedia DNAs of broadcasting signals output from TVs in real time and provide a device communicating between the users of the same group through applications installed in each TV.

Still another object of the present invention is to provide an apparatus, a method, and a computer readable recording medium of grouping users, using a multimedia DNA of broadcast, which group similar multimedia DNAs into the same group by comparing multimedia DNAs of broadcasting signals output from TVs in real time and generate a standard DNA and provide the generated DNA to TVs of each user to allow the TVs of each user to determine whether a channel is changed.

As described above, a characteristic configuration of present invention is as follows for achieving the above objects of the present invention and specific effects of the present invention.

According to an exemplary embodiment of the present invention, there is provided a grouping server, including: a DNA information receiver which receives DNA information on broadcasting signals, which are broadcasted through each TV, from the TVs; a DNA information grouping unit which calculates similarity of the DNA information received through the DNA information receiver and when the calculated similarity satisfies a predetermined similar condition, the DNA information grouping unit determines the similar DNA information as the DNA information of the same broadcasting signal to group the DNA information into the same group; and a group information transmitter which transmits group related information of each group grouped by the DNA information grouping unit to each TV.

The grouping server may further include: a group tag generator which generates the related information on the corresponding group of each group grouped by the DNA information grouping unit as tag information, wherein the group information transmitter further transmits the tag information generated from the group tag generator.

The group related information may include user information on the TV which transmits the DNA information included in the same group.

The grouping server may further include: a standard DNA information generator which determines one DNA selected from at least one DNA included in each group grouped by the DNA information grouping unit as a standard DNA; and a standard DNA information transmitter which transmits the determined standard DNA information from the standard DNA information generator to each TV.

The grouping server may further include: a broadcasting information collector which receives broadcasting information from at least one broadcasting station server; a DNA information generator for each channel which generates DNA information for each broadcasting channel from the broadcasting information received through the broadcasting information collector; a standard DNA information generator which determines the DNA generated by the DNA information generator for each channel as a standard DNA of the group including a DNA similar to the DNA; and a standard DNA information transmitter which transmits the determined standard DNA information from the standard DNA information generator to each TV.

The DNA information grouping unit may calculate similarity by comparing the DNA information received through the DNA information receiver with specific DNA information within each group grouped in advance, and when the calculated similarity satisfies the predetermined similar condition, the DNA information grouping unit may include the user of the TV transmitting the received DNA information in the group related information of the corresponding group.

The DNA information grouping unit may generate a new group including the received DNA information when the calculated similarity does not satisfy the predetermined similar condition.

The DNA information grouping unit may select and store a preset specific number of groups in the order of the largest number of DNAs grouped for each group when the number of generated groups exceeds a preset number, after the grouping.

The DNA information grouping unit may determine the similarity by comparing the DNAs extracted within a preset constant time in consideration of a time difference between the broadcasts when the DNA information received from each TV is the DNA extracted from an Internet Protocol Television (IPTV) or a streaming service.

According to another exemplary embodiment of the present invention, there is provided a method of grouping through a multimedia DNA of broadcast by allowing a grouping server to execute the following process: receiving DNA information on broadcasting signals, which are broadcasted through each TV, from the plurality of TVs; calculating similarity of the received DNA information; grouping DNA information into the same group by determining similar DNA information as the DNA information of the same broadcasting signal when the calculated similarity satisfies a predetermined similar condition; and transmitting group related information of each of the grouped groups to each TV.

The information for receiving the grouping method through the multimedia DNA of broadcasting may be stored in the recording medium which may be read with the server computer. The recording medium includes all the types of recording media storing programs and data so as to be read by a computer system. An example of the recording medium may include a read only memory (ROM), a random access memory (RAM), a compact disk (CD), a digital video disk (DVD)-ROM, a magnetic tape, a floppy disk, an optical data storage device, and the like, and the recording medium may be implemented in a carrier wave (for example, transmission through the Internet) type. Further, the recording medium is distributed into the computer system connected to the network to be able to store codes which may be read with the computer in the distributed type, and to execute the stored codes.

DETAILED DESCRIPTION OF THE INVENTION

Figure 1:
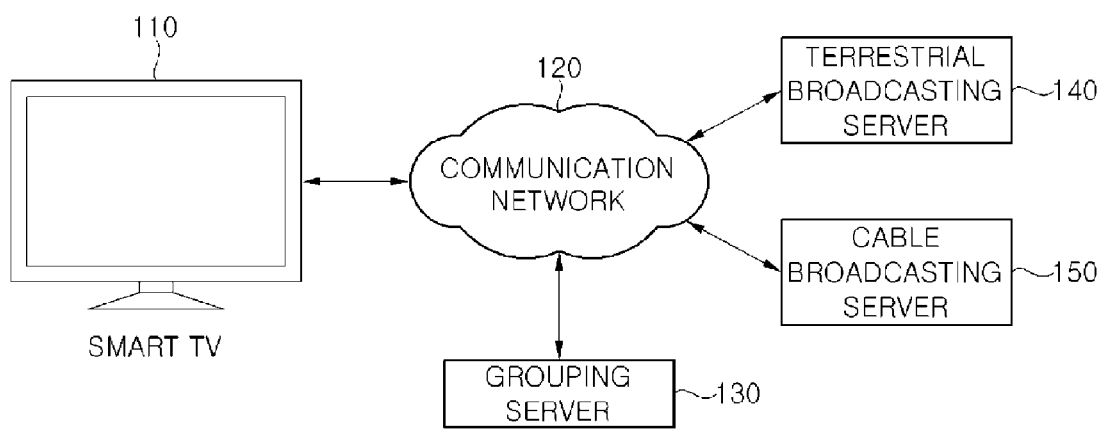
FIG. 1 is a diagram illustrating a grouping system through a multimedia DNA of broadcast according to an exemplary embodiment of the present invention.

The invention is described more fully hereinafter with reference to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. It will be understood that for the purposes of this disclosure, "at least one of X, Y, and Z" can be construed as X only, Y only, Z only, or any combination of two or more items X, Y, and Z (e.g., XYZ, XZ, XYY, YZ, ZZ). Throughout the drawings and the detailed m description, unless otherwise described, the same drawing reference numerals are understood to refer to the same elements, features, and structures. The relative size and depiction of these elements may be exaggerated for clarity.

The terminology used herein is for the purpose of describing particular embodiments only and is not intended to be limiting of the present disclosure. The use of the terms "first", "second", and the like does not imply any particular order, but they are included to identify individual elements. Moreover, the use of the terms first, second, etc. does not denote any order or importance, but rather the terms first, second, etc. are used to distinguish one element from another. Although some features may be described with respect to individual exemplary embodiments, aspects need not be limited thereto such that features from one or more exemplary embodiments may be combinable with other features from one or more exemplary embodiments.

In addition, embodiments described in the specification are wholly hardware, and may be partially software or wholly software. In the specification, "unit", "module", "device", "system", or the like represents a computer related entity such as hardware, combination of hardware and software, or software. For example, in the specification, the unit, the module, the device, the system, or the like may be an executed m process, a processor, an object, an executable file, a thread of execution, a program, and/or a computer, but are not limited thereto. For example, both of an application which is being executed in the computer and a computer may correspond to the unit, the module, the device, the system, or the like in the specification.

Hereinafter, exemplary embodiments of the present invention will be described in detail with reference to the accompanying drawings.

The present invention discloses a system and a method of grouping users based on multimedia DNAs, which regard similar DNAs as the same channel by comparing multimedia DNAs of broadcasting signals output from TVs in real time, and group the users viewing the same channel.

Meanwhile, the multimedia DNA according to the exemplary embodiment of the present invention may be video DNA information extracted from video information output through broadcasting or audio DNA information extracted from audio information.

In this case, the DNA information extracted from each TV (or set top box) is transmitted to a grouping server according to an exemplary embodiment of the present invention, in which the grouping server compares the DNA information received from each TV to group the similar DNAs into the one same group. In this case, a method of determining the similar DNAs may be implemented in various ways. According to the exemplary embodiment of the present invention, the method may compare similarities between the DNAs and group the similar DNAs into the one same group when the similarities indicate at least one of predetermined values.

The grouped results are provided to each TV, and since each TV receives information of users viewing the corresponding channel as the grouped result information, the users may communicate with other users viewing the same channel or may receive various services related to the corresponding channel.

Meanwhile, since the similarity determination is performed in real time, it is difficult for the server (for example, grouping server to be described below) to process the similarity determination on all users in real time. Therefore, the server generates the standard DNA information on each group grouped into the same channel in real time and transmits the generated DNA information to each TV. Each TV compares the standard DNA information with the DNA information on the currently output broadcast to determine the similarity, thereby determining whether the channel is changed. When it is determined that the channel is changed, it is informed to the server that the channel is changed (that is, request the group change), thereby reducing the load of the server. The group information may be updated in real time.

The identification or the recognition of the broadcasting multimedia is a technology of calculating and identifying unique feature elements, such as a video DNA or an audio DNA of each video or audio respectively, as is the case in a human fingerprint. For example, the audio DNA may be considered as a kind of audio fingerprinting. The audio DNA is called various terms, such as a feature vector, and the like, and refers to a feature used to differentiate the audio, like an inherent fingerprint or DNA. As such, the audio DNA used for music recognition is classified into a process of sampling audio for a predetermined time period and a process of extracting a feature from the sampled audio.

The sampling process is a process of sampling and recording an audio signal at a constant frequency, such as 44.1 kHz, for a predetermined time period, e.g., 10 seconds. Further, the process of extracting a feature of audio includes a process of performing various signal processing, such as filtering, wave conversion, amplification, attenuation, and the like, on the sampled audio in a time or frequency space. Therefore, the similar audio DNAs are grouped by comparing the audio DNAs, such that the users viewing the broadcasting of the same channel may be grouped.

Meanwhile, the exemplary embodiment of the grouping through the audio DNAs are described above, but the exemplary embodiment of the present invention is not limited thereto and the grouping through the video DNA may also be performed as described above. That is, the similar video DNAs are grouped by comparing the video DNAs according to another exemplary embodiment of the present invention by a similar method, such that the users viewing the broadcasting of the same channel may be grouped.

Further, the present invention can be applied to the 'TV' having any type, shape, and function to be described below and a smart TV having predetermined applications installed therein and a communication function with the Internet will be described as an example. Meanwhile, the present invention can also be applied to a system having a form in which a set top box is connected to a general TV, not to a smart TV and a part or all of the functions implemented within the smart TV according to the exemplary embodiment of the present invention may be implemented to be functioned within the set top box. Further, in the following description, the smart TV will be described as an example to help the understanding of the present invention, but the present invention is not limited to the smart TV and can be applied to any type of TV having predetermined applications installed therein to provide a network communication function.

Further, in the following description, the m 'broadcasting signal' is a concept including the video signal and the audio signal received through the TV or the set top box and the present invention may include any broadcasting signal, such as a terrestrial broadcasting signal, a cable broadcasting signal, a satellite broadcasting signal, an IPTV broadcasting signal, and the like. In this case, the audio signal included in the broadcasting signal refers to data that are obtained by converting various types of sound, such as speech, audio, music, and the like, into electrical signals and may be transmitted or received, being included in the video signal of the broadcasting signal or may be transmitted or received as a separate signal.

Further, in the following description, the 'gene' is referred to as a 'DNA', which is the extraction information on the feature elements of the video signal or the audio signal for identifying a video or an audio as described above, and the audio DNA may be generated by performing the signal processing on the broadcasting signal by various methods and the method of generating the video DNA or the audio DNA according to the exemplary embodiment of the present invention is not limited to a specific method.

Hereinafter, in order for a person having ordinary skill in the art to easily practice the present invention, the exemplary embodiments of the present invention will be described in detail with reference to the accompanying drawings.

First, a structure of a system and an apparatus according to the exemplary embodiment of the present invention will be described with reference to FIGS. 1 to 4, and a procedure according to the exemplary embodiment of the present invention will be described in detail with reference to FIG. 5 to 7.

System of Grouping Users Through Multimedia DNA

FIG. 1 is a diagram illustrating a grouping system through a multimedia DNA of broadcast according to an exemplary embodiment of the present invention. Referring to FIG. 1, the system according to the exemplary embodiment of the present invention may be configured to include a TV 110, a communication network 120, a grouping server 130, a terrestrial broadcasting server 140, a cable broadcasting server 150.

For implementation of the exemplary embodiment of the present invention, the TV 110 may be a smart TV which may be connected to the communication network 120 and may have applications installed therein to execute the applications, but may be implemented in a form in which a set top box (not shown) is connected to a general TV as described above.

In this configuration, the smart TV 110 receives a broadcasting signal from the terrestrial broadcasting server 140 and the cable broadcasting server 150 to display the broadcasting information of a specific channel selected by a user. FIG. 1 illustrates that the smart TV 100 directly receives the broadcasting signal, but according to the exemplary embodiment of the present invention, as described above, may also receive the broadcasting signal through the set top box (STB) connected to the general TV. For example, the STB may receive the broadcasting signal from the terrestrial broadcasting server 140 or the cable broadcasting server 150 and indirectly provide the received broadcasting signal to the TV. In this case, the STB is connected to the communication network 120 by including an internet connection function to perform communication with the grouping server 130. Further, the STB may provide the functions according to the exemplary embodiment of the present invention by installing separate dedicated applications.

Meanwhile, according to the exemplary embodiment of the present invention, at the time of requesting group information regarding the broadcast which is currently being broadcasted through the smart TV 110 by executing the applications installed in the smart TV 110, the applications collect the video signal or audio signal from the information which is currently being broadcasted through the smart TV 110, and perform the signal processing on the collected video or audio signal (for example, audio) to extract the video DNA or the audio DNA. As such, the extracted video DNA information or the audio DNA information is transmitted to the grouping server 130 through the communication network 120 from the smart TV 110. In this case, according to the exemplary embodiment of the present invention, the video DNA information or the audio DNA information as well as the unique identifier information (for example, a device unique number) or the network IP address of the corresponding smart TV 110 or the set top box, may be transmitted by being mapped together.

The grouping server 130, receiving the video DNA information or the audio DNA information from the smart TV 110 or the set top box, groups the similar DNA information into the same group according to the exemplary embodiment of the present invention. Next, the grouping server 130 generates the standard DNA information for each group and transmits the generated DNA information to each smart TV 110 or the set top box.

Meanwhile, the communication network 120 may be configured regardless of communication aspects, such as wired communication and wireless communication, and may be various communication networks, such as a personal area network (PAN), a local area network (LAN), a metropolitan area network (MAN), a wide area network (WAN), and the like, to suit the situation. In addition, the communication network 120 may be the known World Wide Web (www) and may also use a wireless transmission technology used in short range communications, such as infrared data association (IrDA), Bluetooth, and the like. Further, the communication network 120 may include a cable broadcasting communication network, a terrestrial broadcasting communication network, a satellite broadcasting communication network, and the like, through which the smart TV 110 receives the broadcasting signal.

Hereinafter, the detailed structures of the smart TV 110 and the grouping server 130 will be described with reference to FIGS. 2 to 4.

Figure 2:
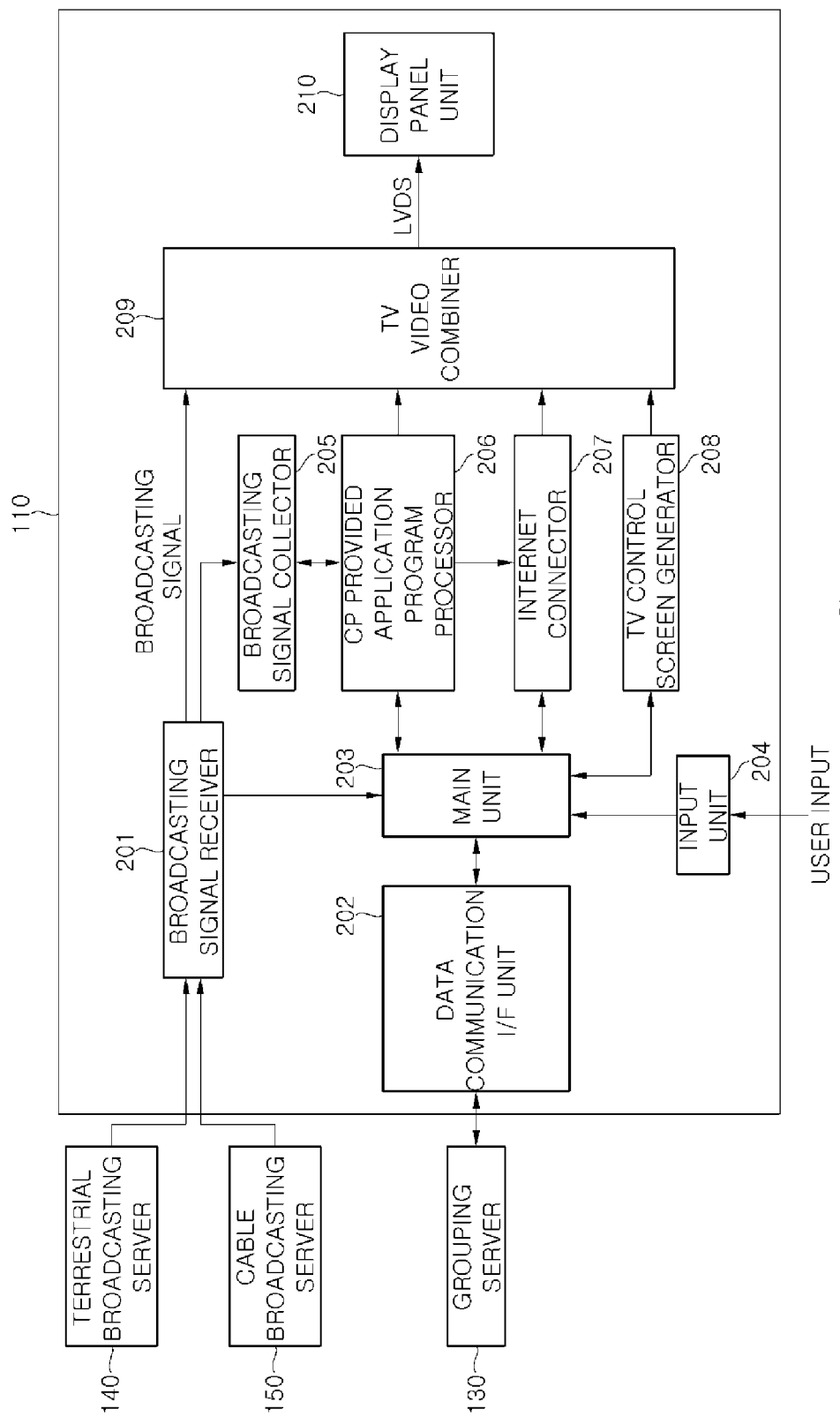
FIG. 2 is a block diagram illustrating a detailed structure of TV according to an exemplary embodiment of the present invention.

FIG. 2 is a block diagram illustrating a detailed m structure of the smart TV 110 according to the exemplary embodiment of the present invention. Referring to FIG. 2, the smart TV 110 according to the exemplary embodiment of the present invention may be configured to include a broadcasting signal receiver 201, a data communication interface (I/F) unit 202, a main controller or unit 203, an input device or unit 204, a broadcasting signal collector 205, a content provider (CP) provided application processor 206, an internet access processor or connector 207, a TV control video or screen generator 208, a TV video combiner 209, and a display panel 210.

The broadcasting signal receiver 201 receives various broadcasting data transmitted from the outside and performs, for example, functions of receiving a terrestrial broadcasting signal, a cable broadcasting signal, an IPTV broadcasting m signal, a satellite broadcasting signal, and the like. For example, a cable TV receiver in the broadcasting signal receiver 201 performs demodulation on the cable TV signal.

In this case, the demodulated data is comprised of compressed video, audio, and additional information. The compressed video is decompressed according to the MPEGx/H.264 standard so as to be generated as a video raw data. Further, the compressed audio is decompressed according to the MPEGx/AC3/AAC standard to be generated as audio raw data. In addition, the additional information is transmitted to the main controller 203. The received broadcasting signal is transmitted to the display panel 210 through the TV video combiner 209. In the broadcasting signal receiver 201, data obtained by allowing the IPTV receiver to demodulate the IPTV signal is the IPTV data received through the Internet and is configured of the compressed video, audio, and additional information. In this case, similar to the cable TV receiver, the compressed video is decompressed according to the MPEGx/H.264 and is generated as the video raw data. The compressed audio is decompressed according to the MPEGx/AC3/AAC standard to be generated as audio raw data. In addition, the additional information is transmitted to the main controller 203.

The data communication I/F 202 is a data communication channel performing data communication independent of the receiving of TV broadcasting contents received in the broadcasting signal receiver 201, and performs the data communication with the broadcasting server 130 through the communication network 120.

The main controller 203 performs a main control function of the smart TV 110 for supporting a function of searching a variety of music and a function of providing music related information based on the grouping server 130. That is, the music related information is provided through the information exchange with a music search server through the internet access. In addition, when a user inputs the selection signal for searching music through the input device 204, the corresponding applications are executed by controlling the CP provided application processor 206. Further, the main controller 203 controls a TV channel change, a TV setting change, such as an audio control, and the like, controls the internet access, and controls application programs provided by a content provider (CP), such as 'T-commerce'.

The broadcasting signal collector 205 performs a function of collecting audio signals and video signals from various broadcasting signals received through the broadcasting signal receiver 201 in response to the broadcasting information request of the CP provided application processor 206.

Generally, the signals used within the TV may be largely classified into four levels according to a level of the signal. The signal having the lowest level is RF (referred to as radio frequency or HF (high frequency)) incoming into a TV antenna line. A single line includes a signal in which the video and the audio are mixed, and a circuit in the TV separates signals having each of the R, G, and B for directly displaying video on the screen and the audio signal from the single signal. The cable broadcasting or the radio wave broadcasting viewed in a general home is received in this signal format.

The signal having a higher level than the RF signal is a composite video banking sync signal (CVBS which is often referred to as a video signal), which is a video signal in which color difference, luminance, and sync are mixed in one signal line, and is a signal in which the audio signals (that is, speech signals) are separated not to be included, and are received together. Commonly, as the signal input and output through a yellow terminal called video output and video input, it is possible to transmit the video signal through one line.

The signal having a higher level than the CVBS is a Y/C or Y/P signal, which is a signal in which luminance and sync are mixed and a signal from which a color difference is separated.

Y, Pb, and Pr, or Y, Cb, and Cr component terminals of the TV or the video are to transmit and receive Y/C and Y/P signals. Further, the signal having a higher level than the Y/C and the Y/P is the RGB signal and the R, G, and B are each separated and the sync signal is also separated, thereby representing the best quality of image.

The broadcasting signal collector 205 performs a function of collecting an image signal (that is, video signal) and/or an speech signal (that is, audio signal) meeting the corresponding signal format, among the broadcasting signals received in various forms as described above.

When the internet access processor 207 performs the internet connection access with the grouping server 130 according to the execution of application programs, the internet access processor 207 performs a function of controlling the internet connection access. Separately from the TV display region, an internet display region is generated on the screen of the TV 110 through the internet access processor 207 to provide various types of information (for example, group related information such as broadcasting group information and broadcasting group chatting information in FIG. 8).

The CP provided application processor 206 provides the user channel detection and the services for each grouped channel by interworking with the grouping server 130. For example, the video DNA or the audio DNA is extracted from the video signal or the audio signal of the user which is currently being broadcasted and is transmitted to the grouping server 130. Further, the CP provided application processor 206 displays the grouping result information received from the grouping server 130 on the screen through the display panel 210.

The TV control video generator 208 may generate a separate control display region for TV channel change, sound volume control, setting change, and the like, on the screen of the TV 110.

The TV video combiner 209 combines each display region provided through the broadcasting signal receiver 201, the internet access processor 207, the CP provided application processor 206, and the TV control video generator 208 in the form set by the user to generate the TV display region. That is, the TV display region is provided by being divided into, for example, the TV display region, the internet display region, a CP display region, a control display region, and the like or may be generated by partially overlapping each region. In this case, as the combined form of the respective display regions, the display screen for TV output may be generated by making each display region independently have different scales according to the user preference or the TV display screen may be generated by transparently or translucently processing the specific display region.

Hereinafter, the detailed structure of the CP provided application processor 206 will be described with reference to FIG. 3.

Cp Provided Application Processor (Smart TV Application)

Figure 3:
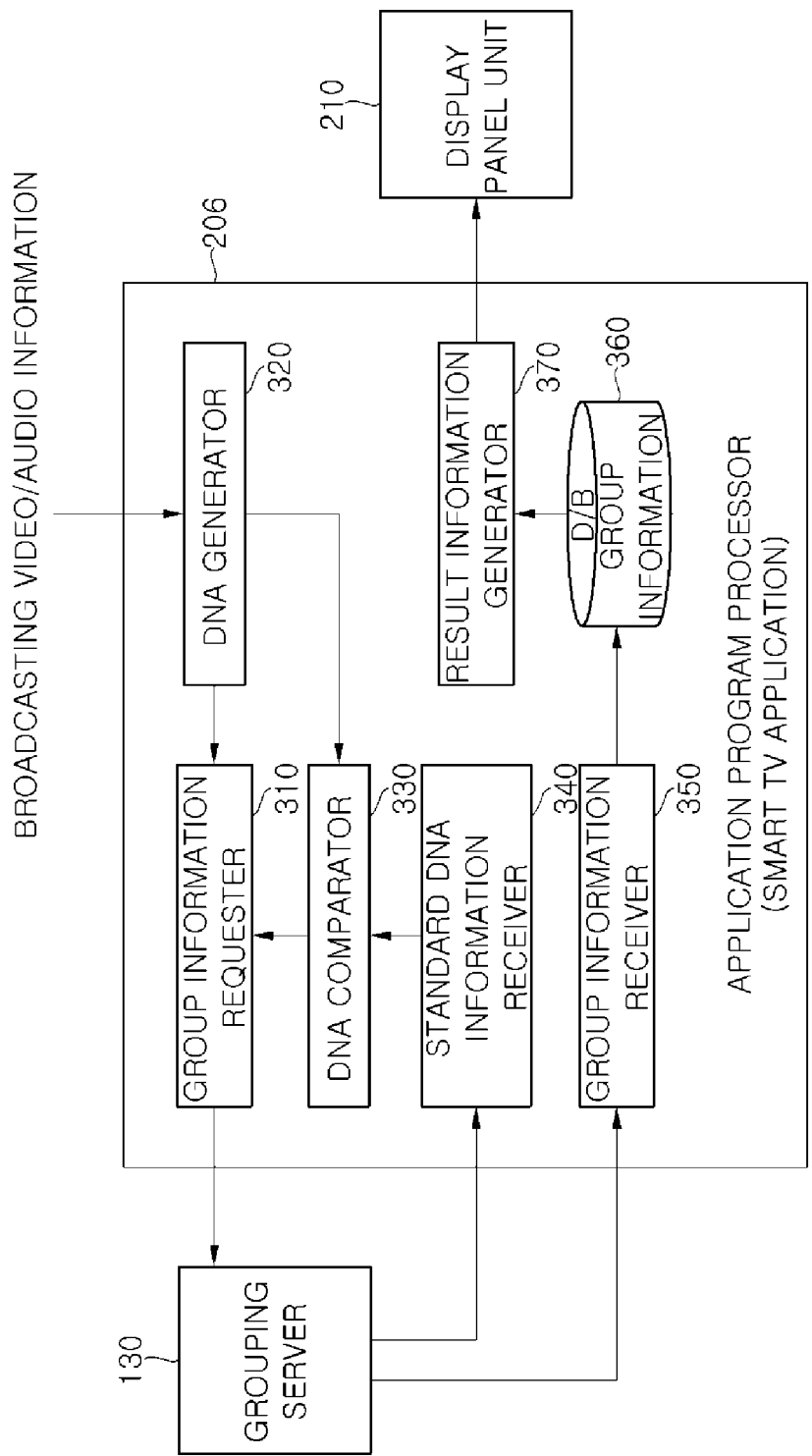
FIG. 3 is a block diagram illustrating detailed functions of applications installed in the TV according to the exemplary embodiment of the present invention.

FIG. 3 is a block diagram illustrating detailed functions of applications installed in the TV 110 according to the exemplary embodiment of the present invention. The applications installed in the smart TV 110 may be configured to include a group information requester 310, a DNA generator 320, a DNA comparator 330, a standard DNA information receiver 340, a group information receiver 350, a group information database 360, and a result information generator 360.

First, the DNA generator 320 serves to generate the video DNA or the audio DNA from the video signal or the audio signal of the broadcasting signal which is currently output through the TV 110. An example of generating the video DNA or the audio DNA will be described below.

The generated DNA information is transmitted to the grouping server 130 through the group information requester 310. The grouping server 130 receives the DNA information from each smart TV and groups the similar DNA into the one same group. Next, the related information (for example, group identifier, channel information of corresponding group, user information within group, and the like) of the corresponding group is transmitted to each smart TV 110.

Figure 8:
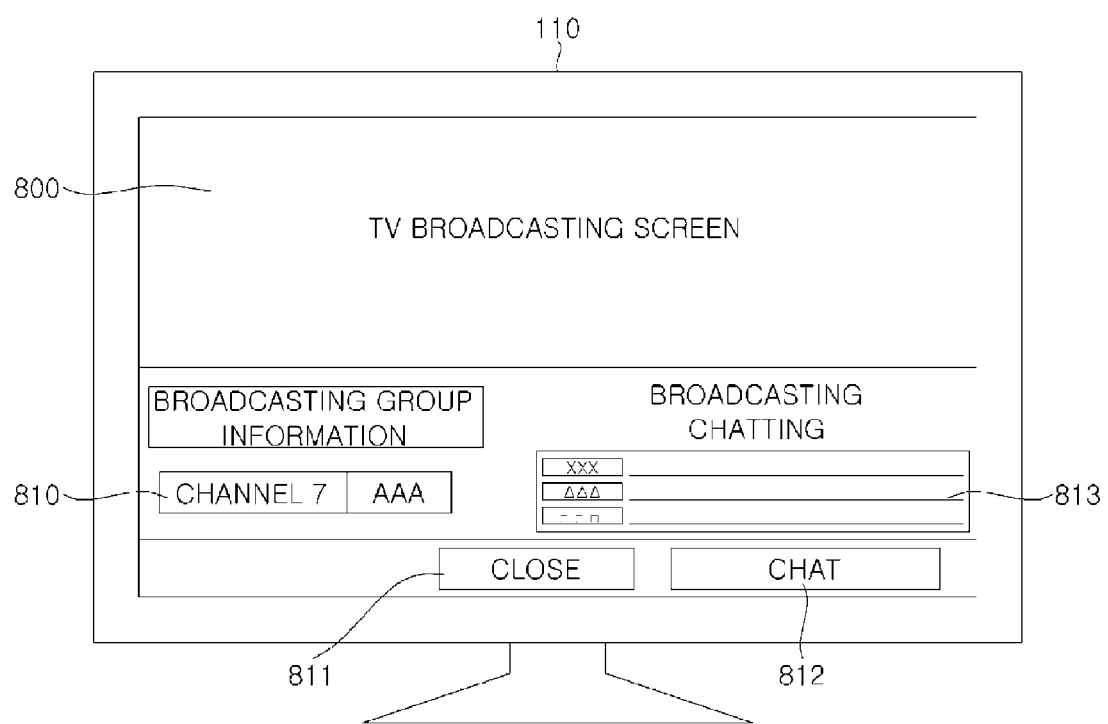
FIG. 8 is an exemplified diagram of a TV screen illustrating an application execution screen according to the exemplary embodiment of the present invention.

Therefore, the group information receiver 350 of the CP provided application program processor 206 receives the group related information transmitted from the grouping server 130 and stores the received group related information in the group information database 360. Meanwhile, the result information generator 370 generates various group related service information (for example, broadcasting group information, channel information, broadcasting group chatting information, and the like, which are illustrated in FIG. 8) from the information stored in the group information database 360, and provides the generated group related service information to the display panel unit 210.

The grouping server 130 generates the standard DNA information on each of the groups according to the method to be described below and transmits the generated standard DNA information to each smart TV 110.

Therefore, the standard DNA information receiver 340 of the CP provided application program processor 206 receives the standard DNA information transmitted from the grouping server 130 and compares the received standard DNA information with the currently extracted DNA using the DNA comparator 330. That is, the DNA comparator 330 compares the video DNA or the audio DNA generated from the video signal or the audio signal which is currently being broadcast through the DNA generator 320 with the standard DNA received from the grouping server 130.

As a comparison result, when the video DNA or the audio DNA is different from the standard DNA or the similarity exceeds a preset value, it is considered that the channel is changed and the group change is requested to the grouping server 130. That is, if it is determined that the comparison result channel of the DNA comparator 330 is changed, the group information requester 310 requests the change into the group of the corresponding changed channel of the grouping server 130. In this case, the group information requester 310 transmits the video DNA or the audio DNA, which is currently extracted through the DNA generator 320, to the grouping server 130, thereby requesting the new group information.

Therefore, the grouping server 130 receives the video DNA or the audio DNA from the group information requester 310 of the smart TV 110 to calculate the similarities of other DNA information, thereby determining the changed group. The determined group information is again transmitted to the corresponding smart TV 110, and the group information receiver 350 of the smart TV 110 receives the transmitted changed group information, which is in turn stored in the group information database 360.

Example of Method of Generating Audio DNA

Hereinafter, an example of the method of generating an audio DNA using the DNA generator 320 will be described. The present invention is not limited to the foregoing embodiments and may generate the audio DNA by various methods depending on different applications. An exemplary method of generating the audio DNA will be described below. An exemplary video DNA may be generated using a method similar thereto or any other suitable methods, and therefore a detailed example of the method of generating the video DNA will be omitted.

In order to generate the audio DNA, the audio signal is stored as a sample for a sample time period (for example, 3 seconds) by a speech coder, and amplitude (db) of the audio signal is measured. In this case, the sample may be stored by measuring the amplitude of the audio signal according to a frequency in a range between 300 Hz and 3 kHz every 11 msec.

Next, among the audio signals according to the frequency, an audio signal having a specific amplitude, for example, 500 db or more is amplified 10 times and an audio signal less than 500 db is attenuated 0.1 times, such that the amplitude of the audio signal may be stored at 256 time intervals. As a modulated result, the audio signal is converted in a form in which only the signal having the specific frequency is present every 11 msec. The converted audio signal may be stored in, for example, an audio file form, such as A.WAV. Therefore, the audio sample is amplified or attenuated in the audio signal having a frequency of a range between 300 Hz and 3 kHz in 256*11 msec in a unit of 11 msec to include the modulated audio signal.

According to the method of generating an audio DNA of a sample from the generated audio sample, the audio samples are divided into 33 frequency sections FI1 to FI33 by selecting only the frequency of 750 Hz to 2750 Hz. Next, the amplitudes of the audio signals are each stored in each frequency section. For example, depending on the following Equation 1, the amplitudes of the 256*33 audio signals corresponding to a product of 256 time intervals (unit time: 11 msec) and 33 frequency sections (unit frequency: 66 Hz) are stored.

$$\text{Amplitude of signal } [i,j]=[Ai,j] \quad \text{[Equation 1]}$$

In the above Equation 1, i (natural number of $1 \leq i \leq 256$) represents the 256 time intervals and j (natural number of $1 \leq j \leq 256$) represents the 33 frequency sections.

In order to generate the audio DNA from the audio signal, depending on the following Equation 2, a difference in amplitudes of signals between adjacent frequencies of a specific time, for example, 11 msec between FI1 and FI2, is obtained. A difference in the amplitudes of the signals between FI2 and FI3, FI3 and FI4, . . . , FI32 and FI33 is obtained by the same method. The difference in the amplitudes of the signals between the adjacent frequency sections is obtained even in the next time 11*2 msec. The difference in the amplitudes of the signals is obtained up to 256*11 msec by the same method. Therefore, the difference value in the amplitudes of 256*32 signals is calculated.

$$\text{Difference } (i=1) \text{ in amplitude of signal}=[A1,k]-[A1,k+1] \quad \text{[Equation 2]}$$

In the above Equation 2, k represents a natural number of 1 to 32.

Next, by calculating the difference value between the adjacent times, for example, between the 11 msec and 11*2 msec again, when the difference value (hereinafter, referred to as a slope) obtained depending on the following Equation 3 is 0 or more, a value of "1" is stored, and when the difference value is less than 0, a value of "0" is stored. The process is performed over the entire time interval. When all the slopes are obtained and stored, 32*256 quantized binary values are stored. The quantized binary value is determined by the audio DNA of the sample.

$$\text{Slope}=([A1,k]-[A1,k+1])-([A2,k]-[A2,k+1]) \quad \text{[Equation 3]}$$

In the above Equation 3, k represents a natural number of 1 to 32.

Meanwhile, the method of generating a standard DNA of a sample in the grouping server 130 may generate the DNA, like the method of generating a DNA of the DNA generator 320.

In addition, another method of generating an audio DNA will be described below. The audio DNA may be converted into an audio DNA signal comprised of a pitch and a duration of each sound by extracting a pitch and a duration of sound from the input audio signal. In this case, the method of extracting the pitch and the duration of sound is as follows.

For convenience of signal processing, the input audio signal is normalized as a value between 0 and 1, and an average of the normalized value is corrected to be 0. Next, bandpass filtering for setting a range of an effective frequency other than an unnecessary frequency domain, such as a frequency range out of an audible region, and the like, to a passband is performed.

Next, it is possible to accurately extract musical characteristics by removing noise of the input audio signal. For example, a method, such as spectral weighting, may be used. Next, the input audio signal is separated in the overlapping frame unit. In this case, each frame is set to overlap each other in a predetermined section. The following procedure for the each separated frame is performed.

First, for each frame, a starting point and an ending point of a section in which an effective sound other than noise is generated are obtained. In detail, the section of the effective signal is determined according to the amplitude of the signal and the amplitude A(k) of the signal of a k-th frame may be calculated depending on the following Equation 4.

$$A(k) = \sum_{n=1}^{N} |x_k(n)| \qquad \text{[Equation 4]}$$

In the above Equation 4, N represents the number of samples within one frame.

In a method of dividing notes, when the value of the amplitude A(k) of the signal for the frame k is larger than a specific threshold value T(k), it is determined as the effective pitch, and when the value is smaller than the specific threshold value T(k), it is determined as a silence section, in which the effective data is not present. In the method of dividing notes, it is important to determine the threshold value T(k) and in order to dynamically obtain the T(k), a global threshold value TG, a threshold value TN of background noise, and a local threshold value TL(k) obtained for a window having a size of 2W+1 in consideration of a frame by W before and after the frame k are used. The threshold value T(k) is obtained as follows.

(1) The global threshold TG is calculated depending on the following Equation 5.

$$T_G = \alpha \cdot \frac{1}{N_F} \cdot \sum_n A(n), \, 0 < \alpha < 1 \qquad \text{[Equation 5]}$$

In the above Equation 5, Nf represents a total number of frames.

(2) The threshold value TN of background noise is calculated by the process such as Equation 6.

$$T_N(i) = \frac{1}{N_N} \sum_{n=i}^{i+N_N-1} A(n) \qquad \text{[Equation 6]}$$

$$T_{N\_min} = \{T_N(i) \mid T_N(i) \le T_N(k)\}, \, \forall k$$

$$T_N = \min\left(\delta \cdot T_{N\_min}, \frac{1}{N_F} \cdot \sum_n A(n)\right), \, \delta > 1$$

(3) For k satisfying 1≤k≤Nf, the local threshold value TL(k) is obtained depending on the following Equation 7.

$$T_L(k) = \beta \cdot \frac{1}{2W+1} \cdot \sum_{n=k-W}^{k+W} A(n), \, 0 < \beta < 1 \qquad \text{[Equation 7]}$$

(4) Depending on the following Equation 8, the largest value among TG, TN, and TL(k) is set as the threshold value T(k) at the frame k.

$$T(k) = \max\{T_G, T_N, T_L(k)\} \qquad \text{[Equation 8]}$$

In connection with whether the frame k is the effective information, when the A(k) is larger than the T(k), the information may be determined to be effective, and when the A(k) is smaller than the T(k), the information may be determined not to be effective.

Pitch extracting process: a semitone value is determined by obtaining the pitches for each frame. In this case, as the method of extracting pitches, for example, an autocorrelation function (ACF) method which is a time domain analysis algorithm depending on the following Equation 9 may be used.

$$\text{semitone}(i) = 12 \times \log_2\left(\frac{\text{pitch}(i)}{440}\right) + 69 \qquad \text{[Equation 9]}$$

Smoothing process: smoothing is performed to more clearly analyze the semitone value. Therefore, the value may be smoothed by applying a linear or non-linear filtering method. For example, the smoothing may be performed by using median filtering which is the non-linear filtering method.

Melody and beat determining process: a melody and a beat which are inherent features of music are extracted by using the smoothed data. The smoothed data has several pitch values within one divided effective sound section. In order to determine the melody and the beat from the smoothed data, when the obtained semitone value is in the effective section divided in the effective section dividing part, the semitone value is maintained originally, and when the obtained semitone value is out of the effective section, the semitone value is set to be 0. That is, the semitone value has a value only in the effective section, and the starting frame and the ending frame may be determined for each effective section. Each effective section is subjected to the following process to determine the melody and the beat.

(1) The section in which a difference between the semitone values is smaller than AD is searched (in this case, AD is 0<ΔD<1).

(2) When the length of the section is smaller than a threshold value LS, the section is set as a stable section, and when the length of the section is larger than the threshold value, the section is set as an unstable section. If the unstable section is disregarded, when the difference in the semitone values in the adjacent stable sections is smaller than 1, the two sections are integrated. That is, the semitone value within the unstable section is readjusted to the semitone value m within the stable section, such that the semitone value is incorporated in the integrated stable section.

(3) The length of the section is determined as a beat by determining the starting frame and the ending frame of the stable section within the effective section determined as described above.

(4) The semitone values are rounded off within the stable section and among these values, a value having the highest frequency is determined as a tune.

All the effective sections are sequentially subjected to the above (1) to (4) processes to determine the melody and the beat. A plurality of notes varying within the one effective sound section may be extracted by the above method.

The audio DNA for an audio signal may be generated by the above processing. The method of generating an audio DNA is described as an example to help the understanding of the present invention and the present invention is not limited thereto.

Grouping Server (Service Server)

Figure 4:
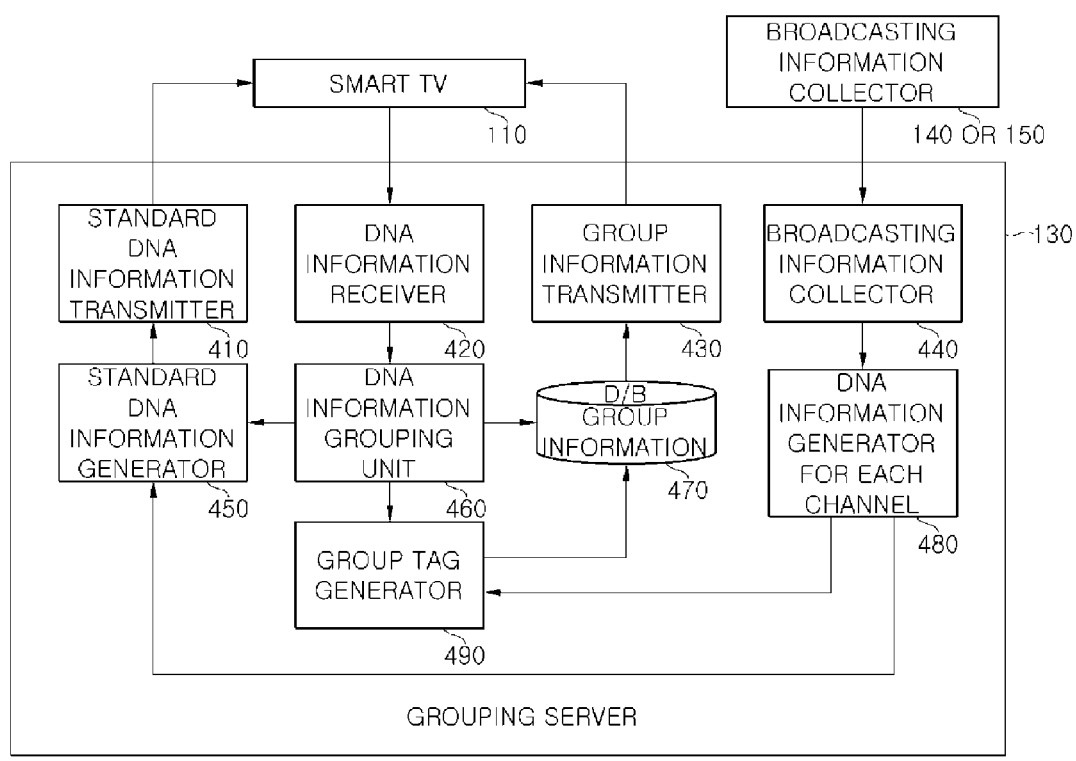
FIG. 4 is a block diagram illustrating a detailed structure of a grouping server according to an exemplary embodiment of the present invention.

FIG. 4 is a block diagram illustrating a detailed function of the grouping server 130 according to an exemplary embodiment of the present invention. Referring to FIG. 4, the grouping server 130 may be configured to include a standard DNA information transmitter 410, a DNA information receiver 420, a group information transmitter 430, a broadcasting information collector 440, a standard DNA information generator 450, a DNA information grouping unit 460, a group information database 470, a DNA information generator for each channel 480, and a group tag generator 490.

First, the DNA information receiver 420 receives the DNA information of the broadcasting signal, which is broadcast through each smart TV 110, from each smart TV 110.

The DNA information grouping unit 460 calculates the similarity of the DNA information received through the DNA information receiver 420 and determines the same broadcasting signal as the similar DNA information when the calculated similarity is equal or more than or equal to or less than the preset value (that is, when the similarity value is large, in the similar case, the calculated similarity is equal to or more than the preset value, and when the similarity value is small, in the similar case, the calculated similarity is equal to or less than the preset value) and groups the DNA information into the same group.

The group information grouped by the DNA information grouping unit 460 is stored in the group information database 470. Further, the group information is transmitted to each smart TV 110 through the group information transmitter 430.

Meanwhile, when the similarity is calculated by the DNA information grouping unit 460, in the case in which the DNA information received from each smart TV 110 is the DNA extracted from an IPTV or a streaming service, unlike live broadcasting, a time difference between the broadcasts may occur. Therefore, the similarity may be determined by using features independent of the time error, or comparing models in a predetermined time period (for example, several seconds). Further, like SHD, full HD, and the like, the resolutions of each smart TV 110 may be different from each other, and therefore a process of normalizing the resolutions may be added.

Further, the grouping server 130 generates the standard DNA of each group grouped by the DNA information grouping unit 460 through the standard DNA information generator 450. In this case, the standard DNA is a DNA which may stand for the corresponding group, and the method of generating the same may be variously implemented. For example, one of the similar DNAs to each other for each group may be selected as the standard DNA, and the DNA information generated for each broadcasting channel generated by the grouping server 130 may be set as the standard DNA.

For example, the broadcasting information collector 440 collects the broadcasting signal for each broadcasting channel and the information related to the corresponding channel from either the terrestrial broadcasting server 140 or the cable broadcasting server 150. The DNA information generator for each channel 480 generates the DNA information on the broadcasting signals for each broadcasting channel collected by the broadcasting information collector 440 and as described above, and may determine the generated DNA information as the standard DNA for the corresponding channel. The determined standard DNA information is transmitted to the smart TV 110 through the standard DNA information transmitter 410. The standard DNA information may be transmitted in real time or periodically and may be used to determine whether the channel in each smart TV 110 is changed (that is, a group change).

The group tag generator 490 generates the related information of the corresponding group (that is, an identified channel) of each group grouped by the DNA information grouping unit 460 as the tag information of the corresponding group. The generated tag information is stored in the group information database 470, and the group information transmitter 430 transmits the generated tag information to each smart TV 110, along with the corresponding group information.

Meanwhile, the DNA information grouping unit 460 groups all the DNAs or most DNAs which are initially collected and then may select and store only the specific number (n) of m groups in the order of the largest number of grouped DNAs. For example, when only the terrestrial broadcasting viewer are grouped, the grouping service for the terrestrial broadcast may be provided by selecting the specific number of groups in the order of the largest number of DNAs belonging to the specific group.

Further, when the specific number of groups is generated as described above and the DNA information receiver 420 receives the DNA information from each smart TV 110, the DNA information grouping unit 460 compares the DNA information within the groups grouped in advance or the standard DNA information of the corresponding group to determine the group. In this case, when there is no group to which the DNA similar to the received DNA information belongs, a new group may also be generated.

Meanwhile, in order to indicate that each component of the grouping server 130 may be functionally and logically separated, each component is separately illustrated in the drawings and does not necessarily mean a physically separate component or is not implemented as a separate code.

Further, in the present specification, each function unit (or module) may mean a functional and structural coupling of hardware for performing the technical spirit of the present invention and software for driving the hardware. For example, each function unit may mean a predetermined code and a logical unit of a hardware resource to perform the predetermined code and does not necessarily mean a physically connected code or a kind of hardware, which may be easily inferred from a person having ordinary skill in the art to which the present invention pertains.

Further, in the present specification, the database may mean the functional and structural coupling of software and hardware which store information corresponding to each database. The database includes all the data storage media which may store information corresponding to the database and a data structure.

As described above, the structures of the system and the apparatus according to the exemplary embodiment of the present invention will be described with reference to FIGS. 1 to 4. Hereinafter, a procedure according to an exemplary embodiment of the present invention will be described in detail with reference to FIGS. 5 to 8.

Method of Grouping Through Multimedia DNA

Figure 5:
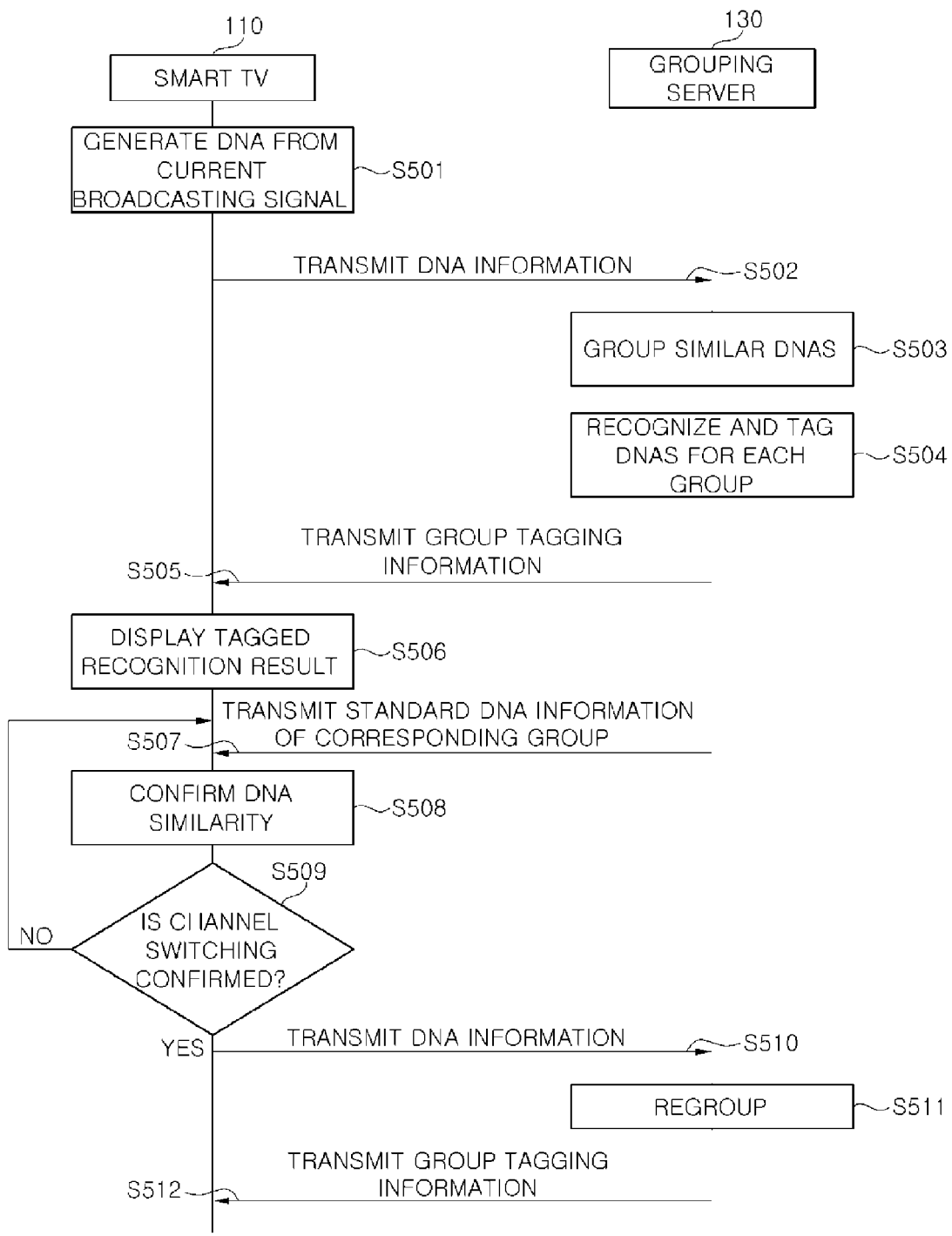
FIG. 5 is a signal flow chart illustrating a grouping procedure through the multimedia DNA of broadcast according to the exemplary embodiment of the present invention.

FIG. 5 is a signal flow chart illustrating a grouping procedure through the multimedia DNA of broadcasting according to the exemplary embodiment of the present invention. Referring to FIG. 5, each smart TV 110 generates the video DNA or the audio DNA from the broadcasting signal which is currently output (S501). The generated DNA information is transmitted to the grouping server 130 (S502).

The grouping server 130 collects the DNA information transmitted from each smart TV 110 and groups the similar DNAs into the one same group (S503). In this case, each group which is grouped may correspond to the specific broadcasting channel. Therefore, even though the broadcasting channel information is not known, the users viewing the broadcasting of the same channel may be grouped into the same group by the grouping process.

As described above for each group, the corresponding result may be tagged to the group by recognizing the DNAs for each group (S504). For example, as the DNA recognition result for group A, the group A may be recognized as a drama which is referred to as 'AAA' which is broadcasting in the broadcasting channel No. 7 (CH7) and the corresponding information may be tagged to the group A. Further, for example, as the DNA recognition result for group B, the group B is recognized as music 'BBB' of a music program which is broadcasting in the broadcasting channel No. 11 (CH 11) and the corresponding information (for example, title of song, singer information, and the like) may be tagged to the group B.

As such, the grouped corresponding group information and the tagging information tagged thereto are transmitted to each smart TV 110 (S505). Each smart TV 110 displays the tagged recognition result of the corresponding group received from the grouping server 130 (S506).

Meanwhile, the grouping server 130 repeatedly transmits the standard DNA information of each of the grouped groups to each smart TV 110 in real time or periodically. Each smart TV 110 compares the standard DNA information of the corresponding group received from the grouping server 130 with the DNA information generated from the broadcasting signal which is currently being viewed to confirm the similarity (S508). In this case, the method of confirming similarity may be identically used with the method of confirming similarity which is used at the time of grouping by the grouping server 130 as described above.

As the similarity confirmation result, if it is determined that the DNAs are not similar to each other and thus the channel is switched (S509), the DNA information generated from the current broadcasting signal is again transmitted to the grouping server 130 (S510), thereby requesting the group resetting.

The grouping server 130 receives the DNA information from the smart TV 110 and compares the similarities of the DNA information within the currently set groups to reset the group (S511). As such, the reset group information and the group tagging information are again transmitted to the smart TV 110 (S512).

Figure 6:
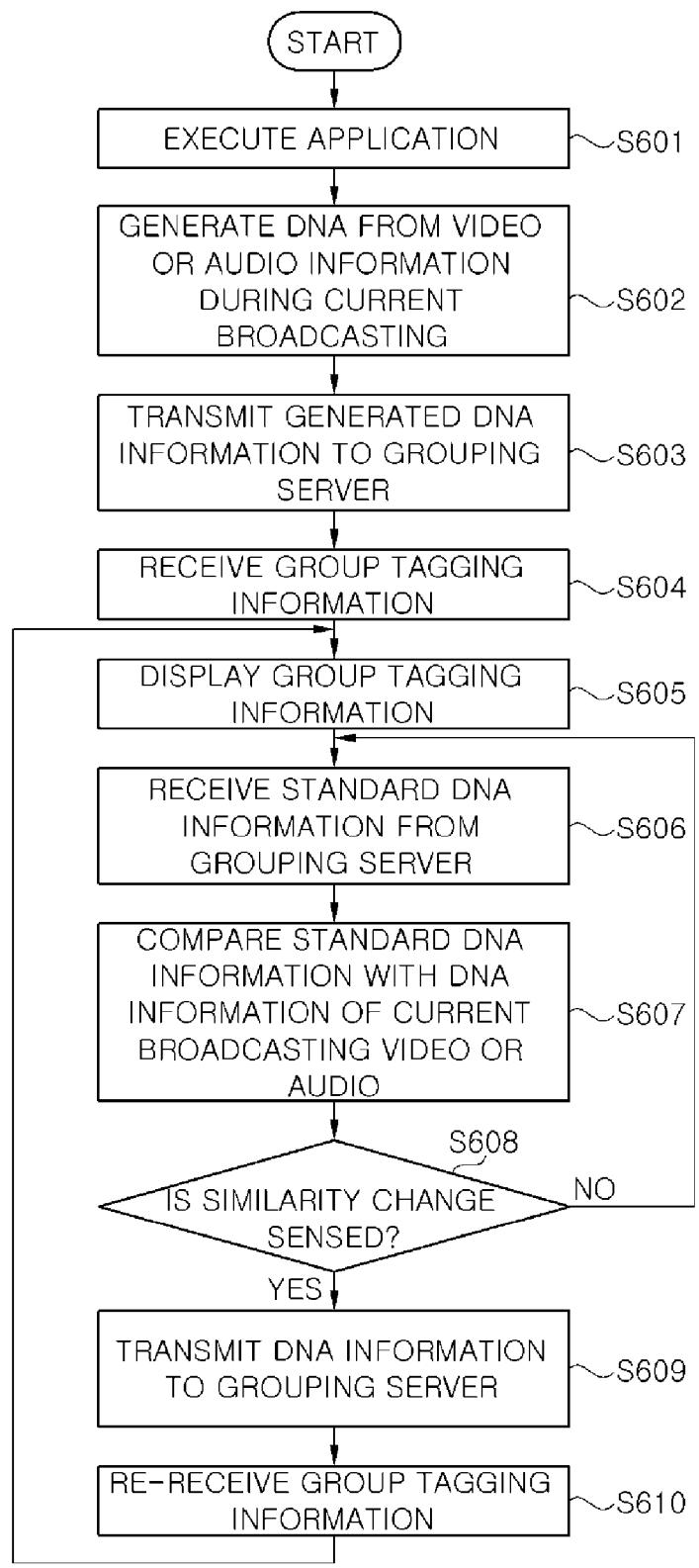
FIG. 6 is a flow chart illustrating an execution procedure of the applications installed in the TV according to the exemplary embodiment of the present invention.

FIG. 6 is a flow chart illustrating an execution procedure of the applications installed in the TV according to the exemplary embodiment of the present invention. Referring to FIG. 6, when the applications installed in TV (for example, smart TV or STB) are executed (S601), the video DNA or the audio DNA is generated from the video or audio information which is currently being broadcasted (S602).

According to the exemplary embodiment of the present invention, the generated DNA information is transmitted to the grouping server 130. As described above, the group information and the group tagging information corresponding to the DNA information are received from the grouping server 130 (S604), and the received group information and group tagging information are displayed (S605).

Meanwhile, the standard DNA information for the corresponding group is continuously received from the grouping server (S606) and the similarity is determined by comparing the received standard DNA information with the video DNA or the audio DNA of the video or audio which is currently being broadcasted to determine the similarity (S607).

As the comparison result, if it is determined that the two DNAs are not similar to each other (S608), it is determined that the channel is changed and thus the group is to be reset, and the DNA information extracted from the broadcasting signal which is currently being broadcast is again transmitted to the grouping server (S609). Next, the corresponding reset group information and group tagging information are received as the group resetting result (S610) and then the process after the step S605 is repeatedly performed.

Figure 7:
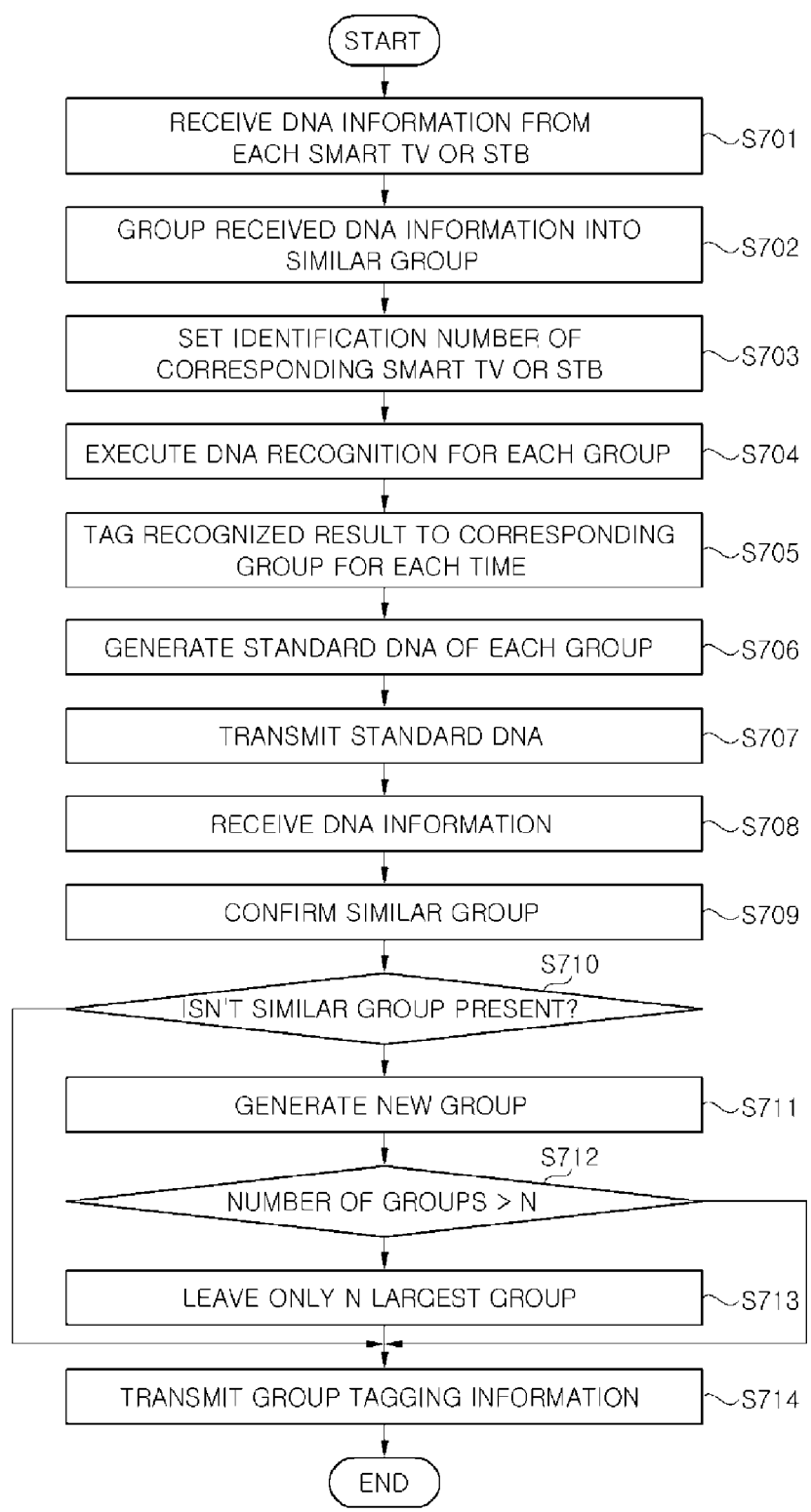
FIG. 7 is a flow chart illustrating an execution procedure of the grouping server according to the exemplary embodiment of the present invention.

FIG. 7 is a flow chart illustrating an execution procedure of the grouping server according to the exemplary embodiment of the present invention. Referring to FIG. 7, the grouping server 130 receives the DNA information from each smart TV or STB 110 (S701). Next, the DNAs are grouped into a similar group by comparing the similarities of the received DNA information (S702). Further, the identification number of the corresponding smart TV or STB is set in the corresponding group (S703).

Further, the recognition for the DNAs for each group is performed (S704) and the recognized result is tagged to the corresponding group for each time (S705). Next, the standard DNAs for each group is generated (S706) and the generated standard DNA is transmitted to each smart TV (S707).

Meanwhile, as described above, when the inquiry request on whether the channel is changed is received by receiving the DNA information from the specific smart TV after the grouping (S708), it is confirmed whether the similar groups are present by comparing the received DNA information with the DNA information within the currently grouped group (S709). When the similar groups are present, the group information and the group tagging information of the corresponding similar group are transmitted to the corresponding smart TV (S714).

On the other hand, when the similar groups are not present, a new group is generated (S711) and the tagging information of the corresponding group is generated, which is in turn transmitted to the corresponding smart TV (S714).

Meanwhile, when the new group is generated as well as at the time of generating the first group, when the number of groups exceeds the preset number (for example, the number of terrestrial broadcasting channels) as described above, only the preset number of groups are kept in the order of the largest group (for example, the group in which the number of similar DNAs within the group are largest) (S713).

The methods according to the exemplary embodiment of the present invention may be implemented as a program instruction type that may be performed through various computer units and may be recorded in a computer readable medium. The computer readable medium may include program instructions, data files, data structure, or the like, alone or a combination thereof. The program command recorded in the computer-readable recording medium may be designed and constituted especially for the present invention, or may be known to those skilled in a field of computer software. An example of the computer readable recording medium may include magnetic media such as hard disk, floppy disk, magnetic tape, and the like, optical media such as CD-ROM, DVD, and the like, magneto-optical media such as floptical disk, and hardware devices specially configured to store and perform program commands such as ROM, RAM, flash memory, and the like. Examples of the program commands may include machine language codes such as being made by compilers as well as high-level language codes capable of being executed by computers using interpreters, or the like. The hardware device may be constituted to be operated as one more software modules in order to perform the action according to the present invention, and vice versa.

As described above, the grouping procedure through the multimedia DNA of broadcasting according to the exemplary embodiment of the present invention will be described in detail. An example of services implemented according to the exemplary embodiment of the present invention will be described below.

An Exemplary Embodiment

FIG. 8 is an exemplified diagram of a TV screen illustrating an application execution screen according to the exemplary embodiment of the present invention. Referring to FIG. 8, as described above, when the smart TV 110 executes the group service related applications according to the exemplary embodiment of the present invention, the identified broadcasting group information 810 may be provided. For example, the channel information (for example, channel 7) and the broadcasting title information (for example, AAA), and the like, which are being broadcasted on the current TV broadcasting screen 800 are received as the tagging information and thus may be displayed on an application display region.

Further, according to the exemplary embodiment of the present invention, a chatting region 813 which may communicate with the users grouped into the corresponding same group may also be provided. Therefore, the user may select the chatting button 812 to perform the chatting with other users viewing the same broadcasting or may select a closing button 811 to complete the corresponding applications.

Although the present invention is described by specific matters such as concrete components, and the like, exemplary embodiments, and drawings, they are provided only for assisting in the entire understanding of the present invention. Therefore, the present invention is not limited to the exemplary embodiments. Various modifications and changes may be made by those skilled in the art to which the present invention pertains from this description.

Therefore, the spirit of the present invention should not be limited to the above-described exemplary embodiments, and the following claims as well as all modified equally or equivalently to the claims are intended to fall within the scopes and spirits of the invention.

What is claimed is:

1. A grouping server, comprising:
   a DNA information receiver which receives DNA information on broadcasting signals, which are broadcasted through each television (TV), from a plurality of TVs;
   a DNA information grouping unit which calculates similarity of the DNA information received through the DNA information receiver, and when the calculated similarity satisfies a predetermined similar condition, the DNA information grouping unit determines similar DNA information as DNA information of a same broadcasting signal to group the similar DNA information into a same group;
   a group information transmitter which transmits group related information of each group grouped by the DNA information grouping unit to each of the plurality of TVs;
   a standard DNA information generator which determines one DNA selected from at least one DNA included in each group grouped by the DNA information grouping unit as a standard DNA; and
   a standard DNA information transmitter which transmits the determined standard DNA received from the standard DNA information generator to each TV.

2. The grouping server of claim 1, further comprising:
   a group tag generator which generates the group related information on a corresponding group of each group grouped by the DNA information grouping unit as tag information,
   wherein the group information transmitter further transmits the tag information generated from the group tag generator to each of the plurality of TVs.

3. The grouping server of claim 1, wherein the group related information includes user information on each TV which transmits the DNA information included in the same group.

4. A grouping server comprising:
   a DNA information receiver which receives DNA information on broadcasting signals, which are broadcasted through each television (TV), from a plurality of TVs;
   a DNA information grouping unit which calculates similarity of the DNA information received through the DNA information receiver, and when the calculated similarity satisfies a predetermined similar condition, the DNA information grouping unit determines similar DNA information as DNA information of the same broadcasting signal to group the similar DNA information into a same group;
   a group information transmitter which transmits group related information of each group grouped by the DNA information grouping unit to each of the plurality of TVs;
   a broadcasting information collector which collects broadcasting information from at least one broadcasting station server;
   a DNA information generator for each channel which generates DNA information for each broadcasting channel from the broadcasting information collected through the broadcasting information collector;
   a standard DNA information generator which determines the DNA information generated by the DNA information generator for each channel as a standard DNA of a group having a DNA similar to the standard DNA; and
   a standard DNA information transmitter which transmits the determined standard DNA from the standard DNA information generator to each TV.

5. The grouping server of claim 1, wherein the DNA information grouping unit calculates the similarity by comparing the DNA information received through the DNA information receiver with specific DNA information within each group grouped in advance, and when the calculated similarity satisfies a predetermined similar condition, the DNA information grouping unit includes a user of a corresponding TV transmitting the received DNA information in the group related information of a corresponding group.

6. The grouping server of claim 5, wherein the DNA information grouping unit generates a new group including the received DNA information when the calculated similarity does not satisfy the predetermined similar condition.

7. The grouping server of claim 1, wherein the DNA information grouping unit selects and stores only a preset specific number of groups in the order of a largest number of DNAs grouped for each group when a number of generated groups exceeds a preset number, after the grouping.

8. The grouping server of claim 1, wherein the DNA information grouping unit determines the similarity by comparing DNAs extracted during a preset constant time period based on a time difference between broadcasts when the DNA information received from each TV is the DNA extracted from an IPTV or a streaming service.

9. A method of grouping broadcasting signals based on a multimedia DNA of a corresponding broadcast by allowing a grouping server, via a computer processor, to execute the process comprising:
   receiving DNA information on broadcasting signals, which are broadcasted through each television (TV), from a plurality of TVs;
   calculating similarity of the received DNA information;
   grouping the DNA information from the plurality of TVs into a same group by determining similar DNA information as DNA information of a same broadcasting signal when the calculated similarity satisfies a predetermined similar condition; and
   transmitting group related information of each of the grouped groups to each of the plurality of TVs;
   determining one DNA selected from at least one DNA included in each of the grouped groups as a standard DNA; and
   transmitting the determined standard DNA to each TV.

10. The method of claim 9, further comprising:
    generating the group related information on a corresponding group of each group as tag information,
    wherein the generated tag information is further transmitted to each of the plurality of TVs.

11. The method of claim 9, wherein the group related information includes user information on each TV which transmits the DNA information included in the same group.

12. A method of grouping broadcasting signals based on a multimedia DNA of a corresponding broadcast by allowing a grouping server, via a computer processor, to execute the process; comprising:
    receiving DNA information on broadcasting signals, which are broadcasted through each television (TV), from a plurality of TVs;
    calculating similarity of the received DNA information;
    grouping the DNA information from the plurality of TVs into a same group by determining similar DNA information as DNA information of a same broadcasting signal when the calculated similarity satisfies a predetermined similar condition; and
    transmitting group related information of each of the grouped groups to each of the plurality of TVs;
    collecting broadcasting information from at least one broadcasting station server;
    generating DNA information for each broadcasting channel from the collected broadcasting information;
    determining the generated DNA as a standard DNA of a group including a DNA similar to the standard DNA; and
    transmitting the determined standard DNA information to each TV.

13. The method of claim 9, wherein in the grouping of the DNA information, the similarity is calculated by comparing the DNA information from the plurality of TVs with specific DNA information within each group grouped in advance, and when the calculated similarity satisfies a predetermined similar condition, including a user of a corresponding TV transmitting the received DNA information in the group related information of a corresponding group.

14. The method of claim 13, wherein in the grouping of the DNA information, a new group including the received DNA information is generated when the calculated similarity does not satisfy the predetermined similar condition.

15. The method of claim 9, wherein only a preset specific number of groups are selected and stored in the order of a largest number of DNAs grouped for each group when a number of generated groups exceeds a preset number, after the grouping.

16. The method of claim 9, wherein the similarity is determined by comparing the DNAs extracted during a preset constant time period based on a time difference between broadcasts when the DNA information received from each TV is the DNA extracted from an IPTV or a streaming service.

17. A non-transitory computer readable medium storing an executable program which, when executed by a computer, performs a method of grouping broadcasting signals based on a multimedia DNA of a corresponding broadcast, the method comprising:
    receiving DNA information on broadcasting signals, which are broadcasted through each television (TV), from a plurality of TVs;
    calculating similarity of the received DNA information;
    grouping the DNA information from the plurality of TVs into a same group by determining similar DNA information as DNA information of a same broadcasting signal when the calculated similarity satisfies a predetermined similar condition;
    transmitting group related information of each of the grouped groups to each of the plurality of TVs;
    determining one DNA selected from at least one DNA included in each of the grouped groups as a standard DNA; and
    transmitting the determined standard DNA to each TV.

* * * * *